US012444339B2

(12) United States Patent
Han et al.

(10) Patent No.: US 12,444,339 B2
(45) Date of Patent: Oct. 14, 2025

(54) DISPLAY APPARATUS, IMAGE SIGNAL PROCESSING APPARATUS, COLLECTION APPARATUS AND DISPLAY SYSTEM

(71) Applicant: BOE Technology Group Co., Ltd., Beijing (CN)

(72) Inventors: Peng Han, Beijing (CN); Huidong He, Beijing (CN); Qianwen Jiang, Beijing (CN); Juanjuan Shi, Beijing (CN); Weihua Du, Beijing (CN); Hao Zhang, Beijing (CN); Lili Chen, Beijing (CN); Xue Dong, Beijing (CN); Yongzhong Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/578,685

(22) PCT Filed: Aug. 31, 2021

(86) PCT No.: PCT/CN2021/115529
§ 371 (c)(1),
(2) Date: Jan. 11, 2024

(87) PCT Pub. No.: WO2023/028806
PCT Pub. Date: Mar. 9, 2023

(65) Prior Publication Data

US 2024/0321166 A1 Sep. 26, 2024

(51) Int. Cl.
*G09G 3/20* (2006.01)
*G09G 3/22* (2006.01)
(Continued)

(52) U.S. Cl.
CPC ............. *G09G 3/2011* (2013.01); *G09G 3/22* (2013.01); *H04N 25/767* (2023.01); (Continued)

(58) Field of Classification Search
CPC .......... G09G 3/22; G09G 3/32; G09G 3/3208; G09G 3/3275–3291; G09G 3/36; (Continued)

(56) References Cited

U.S. PATENT DOCUMENTS

2003/0146369 A1 * 8/2003 Kokubun ............ H04N 25/616 348/E3.021
2005/0237406 A1 10/2005 Kim et al.
(Continued)

FOREIGN PATENT DOCUMENTS

CN 1870119 A 11/2006
CN 101827225 A 9/2010
(Continued)

OTHER PUBLICATIONS

PCT/CN2021/115529 international search report dated May 19, 2022.

*Primary Examiner* — Nathan Danielsen
(74) *Attorney, Agent, or Firm* — IPro, PLLC

(57) ABSTRACT

Provided in the present disclosure are a display apparatus, an image signal processing apparatus, a collection apparatus and a display system. The display apparatus includes: a plurality of pixels, which are arranged in an array; a plurality of scan lines, which are respectively coupled to the plurality of pixels and extend in a row direction; a plurality of data lines, which are respectively coupled to the plurality of pixels and extend in the row direction; a plurality of control lines, which are respectively coupled to the plurality of pixels and extend in a column direction; a data bus, which is coupled to the data lines; a plurality of first switch circuits, which correspond to one data line; and a plurality of second switch circuits, which correspond to the pixels.

17 Claims, 6 Drawing Sheets

(51) Int. Cl.
*H04N 25/767* (2023.01)
*H04N 25/78* (2023.01)

(52) U.S. Cl.
CPC ..... *H04N 25/78* (2023.01); *G09G 2300/0814* (2013.01); *G09G 2310/0286* (2013.01); *G09G 2310/0291* (2013.01); *G09G 2320/0252* (2013.01); *G09G 2320/045* (2013.01)

(58) Field of Classification Search
CPC ..... G09G 3/3611; G09G 3/3685–3696; G09G 5/003–006; G09G 2300/0421; G09G 2300/0426; G09G 2300/06; G09G 2300/08; G09G 2300/0814; G09G 2300/088–0895; G09G 2310/02; G09G 2310/0202; G09G 2310/0208; G09G 2310/0218; G09G 2310/0243; G09G 2310/0262; G09G 2310/027–0275; G09G 2310/0286; G09G 2310/0294; G09G 2310/0297; G09G 2310/04; G09G 2310/06; G09G 2310/08; G09G 2320/0223; G09G 2320/0252; G09G 2320/0271; G09G 2320/0276; G09G 2320/045; G09G 2320/10; G09G 2320/103; G09G 2340/14; H04N 25/76–768; H04N 25/778; H04N 25/78
See application file for complete search history.

(56) References Cited

U.S. PATENT DOCUMENTS

| | | | | |
|---|---|---|---|---|
| 2006/0262059 | A1 | 11/2006 | Hashimoto et al. | |
| 2010/0171853 | A1 | 7/2010 | Kondo | |
| 2014/0362214 | A1* | 12/2014 | Lee | H04N 5/268 348/143 |
| 2017/0168624 | A1* | 6/2017 | Lee | G06F 3/0412 |

FOREIGN PATENT DOCUMENTS

| | | | |
|---|---|---|---|
| CN | 102324225 | A | 1/2012 |
| CN | 103280195 | A | 9/2013 |
| CN | 104243905 | A | 12/2014 |
| JP | 2005312025 | A | 11/2005 |

* cited by examiner

DISPLAY APPARATUS, IMAGE SIGNAL PROCESSING APPARATUS, COLLECTION APPARATUS AND DISPLAY SYSTEM

CROSS REFERENCE TO RELATED APPLICATIONS

The present disclosure is a US National Stage of International Application No. PCT/CN2021/115529, filed on Aug. 31, 2021, the entire contents of which are incorporated herein by reference.

TECHNICAL FIELD

The present disclosure relates to the technical field of display, in particular to a display apparatus, an image signal processing apparatus, a collection apparatus and a display system.

BACKGROUND

With development of intelligence science and technology, high technology has various simulation technologies for human senses, such as the visual sense, the auditory sense, the taste sense and the tactile sense. The visual sense of human eyes is the first need of people, and a camera may serve as human eyes at present to capture current scene information of places invisible for the human eyes and is an extension of the human visual sense. However, in the related art, image information captured by the camera and seen by the human eyes has a large delay. Taking a mixed reality (MR) system integrated with a virtual world and a real world as an example, an existing MR system usually includes a camera end and a display end, and a real-time image captured by the camera end and seen by the human eyes through the display end is usually two or more frames of previous images. Clearly, an existing display device has a technical problem of a transmission delay from image capturing to image display.

SUMMARY

The present disclosure provides a display apparatus, an image signal processing apparatus, a collection apparatus and a display system. Specific solutions are as follows.

An embodiment of the present disclosure provides a display apparatus, including:

- a plurality of pixels arranged in an array; a plurality of scan lines coupled to the plurality of pixels respectively and extending in a row direction; a plurality of data lines coupled to the plurality of pixels respectively and extending in the row direction; a plurality of control lines coupled to the plurality of pixels respectively and extending in a column direction; a data bus coupled to the data lines; a plurality of first switch circuits corresponding to one data line; and a plurality of second switch circuits corresponding to the pixels, wherein the pixels each include a pixel electrode,
- the first switch circuits are configured to control, in response to signals of the corresponding scan lines, the coupling between the corresponding data lines and the data bus, and the second switch circuits are configured to control, in response to signals of the corresponding control lines and the signals of the corresponding scan lines, pixel electrodes of the pixels to be coupled to the corresponding data lines.

Optionally, in the embodiment of the present disclosure, the display apparatus further includes a row driving timing control circuit coupled to each scan line and a data bus controller coupled to each control line, wherein

- the row driving timing control circuit is configured to output a scan signal to each scan line and the corresponding first switch circuit in sequence; and the data bus controller is configured to output a control signal to each control line in sequence.

Optionally, in the embodiment of the present disclosure, the first switch circuits each include a first transistor, the second switch circuits each include a second transistor and a third transistor, a gate electrode of the first transistor and a gate electrode of the third transistor are coupled to the corresponding scan lines, a first electrode of the first transistor is coupled to the data bus, a second electrode of the first transistor and a first electrode of the second transistor are coupled to the corresponding data lines, a gate electrode of the second transistor is coupled to the corresponding control line, a second electrode of the second transistor is coupled to a first electrode of the third transistor, and a second electrode of the third transistor is coupled to the pixel electrode of the corresponding pixel.

Optionally, in the embodiment of the present disclosure, the data bus controller includes a plurality of shift register units in a cascade connection, a signal output end of each shift register unit is coupled to the corresponding control line, in every two adjacent shift register units, a signal input end of a lower-level shift register unit is coupled to a signal output end of an upper-level shift register unit, another signal input end of each shift register unit is coupled to a bus timing controller, the bus timing controller is configured to output a clock pulse signal and load the clock pulse signal to each shift register unit to be connected to the data bus controller and a corresponding column of pixels on the corresponding row of pixels so as to charge the corresponding pixel.

Optionally, in the embodiment of the present disclosure, the display apparatus further includes a first amplifier coupled to the data bus, and the first amplifier is configured to receive an analog image signal from the data bus, amplify the analog image signal and output an amplified analog signal to each data line.

Correspondingly, an embodiment of the present disclosure provides an image signal processing apparatus, including:

- a gray-scale separation unit, wherein the gray-scale separation unit includes a plurality of voltage comparators, input ends of the voltage comparators are coupled, output ends of the voltage comparators are coupled, and the gray-scale separation unit is configured to output an inputted analog image signal from a target voltage comparator matching a gray-scale voltage of the analog image signal in the plurality of voltage comparators, wherein the voltage comparators correspond to different gray-scale voltages.

Optionally, in the embodiment of the present disclosure, the gray-scale voltages corresponding to the voltage comparators are in a decreasing tendency in an input direction of the analog image signal.

Optionally, in the embodiment of the present disclosure, each voltage comparator includes a window comparator, the window comparator includes a first comparator, a second comparator and a power supply end which is configured to provide a working power for the first comparator and the second comparator, an input end of the window comparator is coupled to a non-inverting input end of the first comparator and an inverting input end of the second comparator, an output end of the first comparator and an output end of the second comparator are coupled to an output end of the window comparator, an inverting input end of the first comparator is coupled, through a first resistor, to a first threshold voltage end which is configured to provide a first threshold voltage, a non-inverting input end of the second comparator is coupled, through a second resistor, to a second threshold voltage end which is configured to provide a second threshold voltage, and an analog image signal of which a gray-scale voltage is located between the first threshold voltage and the second threshold voltage is outputted through the output end of the window comparator;

a first threshold voltage and a second threshold voltage corresponding to any two voltage comparators in the plurality of voltage comparators are different, and a voltage defined by the first threshold voltage and the second threshold voltage corresponding to each window comparator is a gray-scale voltage of the corresponding voltage comparator.

Optionally, in the embodiment of the present disclosure, each voltage comparator further includes a voltage division circuit coupled to the window comparator, and the voltage division circuit includes a third resistor coupled to the power supply end and the output end of the window comparator respectively, and a fourth resistor coupled to the output end of the window comparator and the ground respectively, wherein a voltage, outputted through the output end of the corresponding window comparator, of the analog image signal inputted through the input end of the window comparator is a gray-scale voltage of the analog image signal.

Optionally, in the embodiment of the present disclosure, a switching diode is further arranged between output ends of every two adjacent voltage comparators, and in an input direction of the analog image signal, a cathode of the switching diode is coupled to the output end of the former voltage comparator, and an anode of the switching diode is coupled to the output end of the latter voltage comparator.

Optionally, in the embodiment of the present disclosure, the image signal processing apparatus further includes a filter coupled to the input end of each voltage comparator, and the filter is configured to filter out noise in the analog image signal and input the analog signal of which the noise is filtered out to the gray-scale separation unit.

Optionally, in the embodiment of the present disclosure, the image signal processing apparatus further includes a second amplifier coupled to the output end of each voltage comparator respectively, and the second amplifier is configured to amplify the analog signal of which the noise is filtered out.

Correspondingly, an embodiment of the present disclosure provides an image signal collection apparatus, including:

a plurality of image-sensitive units arranged in an array, a plurality of first signal lines coupled to the plurality of image-sensitive units respectively and extending in a row direction, a plurality of second signal lines coupled to the plurality of image-sensitive units respectively and extending in a column direction, a row selection controller coupled to each first signal line, a column selection controller coupled to a first end of each second signal line, a timing control circuit coupled to the row selection controller and the column selection controller respectively, and an output bus coupled to a second end of each second signal line, wherein the plurality of image-sensitive units are configured to collect image information from the outside and convert the image information to an analog image signal; the row selection controller is configured to output a scan signal to the plurality of first signal lines in sequence; the column selection controller is configured to control switching on a plurality of column control switches in sequence so as to output a reference voltage to the corresponding first signal lines and extract an analog signal generated by exposure on the corresponding image-sensitive units; and the output bus is configured to output the analog signal after exposure.

Optionally, in the embodiment of the present disclosure, each image-sensitive unit includes a photosensitive diode and a row scan control switch.

Correspondingly, an embodiment of the present disclosure provides a display system, including:

an image signal collection apparatus, a display apparatus and an image signal processing apparatus which is coupled to the image signal collection apparatus and the display apparatus respectively, wherein the image signal collection apparatus is configured to convert collected image information to an analog image signal and transmit the analog image signal to the image signal processing apparatus;

the image signal processing apparatus is configured to determine a gray-scale voltage of the analog image signal and transmit the analog image signal to the display apparatus; and the display apparatus is configured to perform displaying according to the analog image signal.

Optionally, in the embodiment of the present disclosure, the image signal processing apparatus includes:

a gray-scale separation unit, wherein the gray-scale separation unit includes a plurality of voltage comparators, input ends of the voltage comparators are coupled, output ends of the voltage comparators are coupled, and the gray-scale separation unit is configured to output an inputted analog image signal from a target voltage comparator matching a gray-scale voltage of the analog image signal in the plurality of voltage comparators, wherein the voltage comparators correspond to different gray-scale voltages.

Optionally, in the embodiment of the present disclosure, the display apparatus includes:

a plurality of pixels arranged in an array, a plurality of scan lines coupled to the plurality of pixels respectively and extending in a row direction, a plurality of data lines coupled to the plurality of pixels respectively and extending in the row direction, a plurality of control lines coupled to the plurality of pixels respectively and extending in a column direction, a data bus coupled to the data lines, a plurality of first switch circuits corresponding to one data line, and a plurality of second switch circuits corresponding to the pixels, wherein the pixels each include a pixel electrode, wherein the first switch circuits are configured to control, in response to signals of the corresponding scan lines, the coupling between the data lines and the data bus; and the second switch circuits are configured to control, in response to signals of the corresponding control lines and the signals of the corresponding scan lines, pixel electrodes of the pixels to be coupled to the corresponding data lines.

Optionally, in the embodiment of the present disclosure, the image signal collection apparatus includes:

a plurality of image-sensitive units arranged in an array, a plurality of first signal lines coupled to the plurality of image-sensitive units respectively and extending in a row direction, a plurality of second signal lines coupled to the plurality of image-sensitive units respectively and extending in a column direction, a row selection controller coupled to each first signal line, a column selection controller coupled to a first end of each second signal line, a timing control circuit coupled to the row selection controller and the column selection controller respectively, and an output bus coupled to a second end of each second signal line, wherein the plurality of image-sensitive units are configured to collect image information from the outside and convert the image information to the analog image signal; the row selection controller is configured to output a scan signal to the plurality of first signal lines in sequence; the column selection controller is configured to control switching on a plurality of column control switches in sequence so as to output a reference voltage to the corresponding first signal lines and extract an analog signal generated by exposure on the corresponding image-sensitive units; and the output bus is configured to output the analog signal after exposure.

Optionally, in the embodiment of the present disclosure, the display apparatus further includes an application processor, and in a case that the display system is in a human-computer interaction mode, the application processor is configured to render and generate virtual image data to obtain rendered image data, send the rendered image data to the plurality of pixels in the display apparatus so as to make the plurality of pixels display the rendered image data; and in a case that the display system is in an outside scene capturing mode, the plurality of pixels display the analog image signal.

DETAILED DESCRIPTION

In order to make objectives, technical solutions and advantages of the embodiments of the present disclosure clearer, the technical solutions of the embodiments of the present disclosure are clearly and completely described in the following with reference to accompanying drawings of the embodiments of the present disclosure. Apparently, the described embodiments are some rather than all of the embodiments of the present disclosure. The embodiments in the present disclosure and features in the embodiments may be mutually combined without conflicts. All other embodiments obtained by those ordinarily skilled in the art based on the described embodiments of the present disclosure without making creative efforts fall within the protection scope of the present disclosure.

Unless otherwise defined, technical or scientific terms used in the present disclosure are supposed to have common meanings as understood by those ordinarily skilled in the art to which the present disclosure pertains. "Include", "comprise" or similar words used in the present disclosure mean that an element or an item preceding the word covers an element or an item or its equivalents listed after the word without excluding other elements or items.

Figure 1:
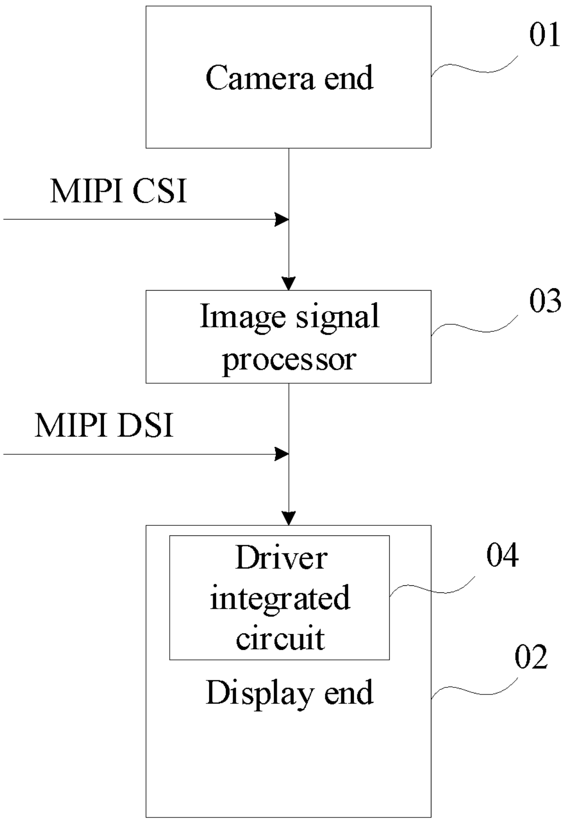
FIG. 1 is a diagram of an architecture of a camera end and a display end in an existing mixed reality system.

FIG. 1 shows a diagram of an architecture of a camera end 01 and a display end 02 in an existing mixed reality system. Specifically, the camera end 01 captures pixel information through a color film, then performs photoelectric signal conversion on the captured pixel information and performs analog-digital conversion to form image information; and then the image information is transmitted to an image signal processor (ISP) 03 through protocols such as a universal serial bus (USB), a mobile industry processor interface (MIPI) and a camera serial interface (CSI), the image signal processor 03 performs a series of processing on the image information, such as black level calibration, dead pixel calibration, denoising, automatic white balance and data enhancement, after data processing is completed, a data protocol is converted to an MIPI display serial interface (DSI) protocol that is receivable by a driver integrated circuit (driver IC) 04 of the display end 02, then data is transmitted to the driver IC 04, the driver IC 04 parses the data and then converts the data to an analog signal, namely, a source signal, and the source signal is displayed by the display end 02.

Since the mixed reality system needs the image signal processor 03 for operations such as image processing and data conversion, time from capturing an image by the camera end 01 to displaying the image by the display end 02 is usually delayed for a duration of at least two frames, the duration of the two frames includes a fixed image rendering processing duration of one frame, and a duration of another one or more frames is a time delay caused by operations such as image processing and protocol conversion. Clearly, an existing display device has a technical problem of a transmission delay from image capturing to image display.

In view of this, embodiments of the present disclosure provide a display apparatus, an image signal processing apparatus, a collection apparatus and a display system, which are configured to avoid transmission delay of a display device from image capturing to image display and improve a real-time property of the display device from image capturing to image display.

Figure 2:
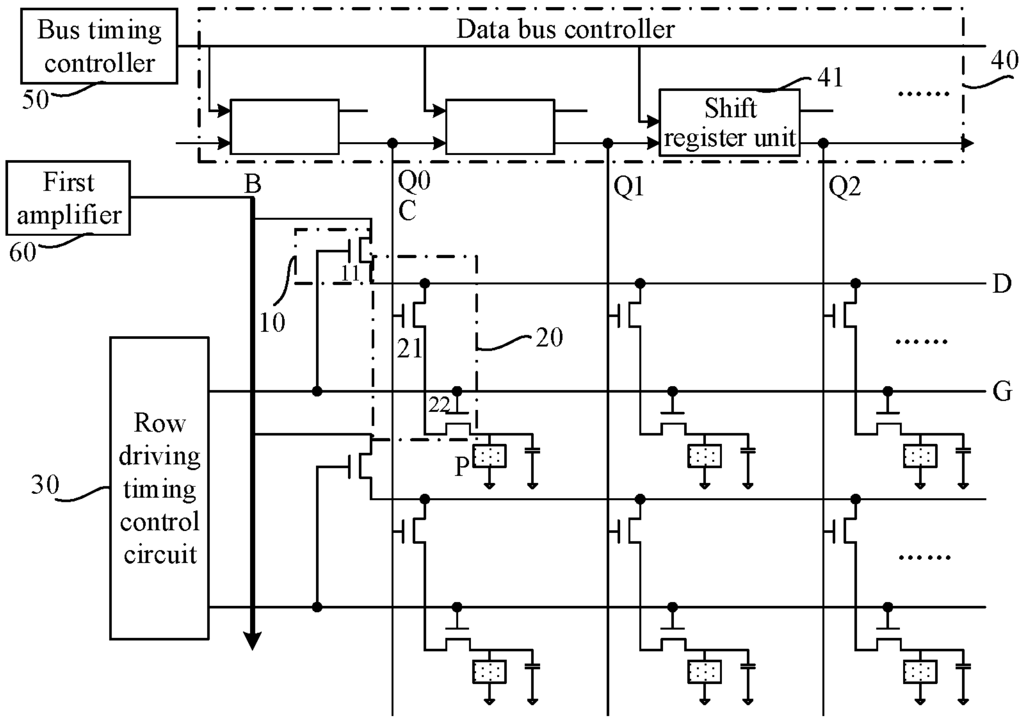
FIG. 2 is a schematic structural diagram of a display apparatus provided by an embodiment of the present disclosure.

FIG. 2 shows a schematic structural diagram of a display apparatus provided by an embodiment of the present disclosure, specifically, the display apparatus includes:

a plurality of pixels P arranged in an array, a plurality of scan lines G coupled to the plurality of pixels P respectively and extending in a row direction, a plurality of data lines D coupled to the plurality of pixels respectively and extending in the row direction, a plurality of control lines C coupled to the plurality of pixels respectively and extending in a column direction, a data bus B coupled to the data lines D, a plurality of first switch circuits 10 corresponding to one data line D, and a plurality of second switch circuits 20 corresponding to the pixels P, wherein the pixels P each include a pixel electrode, the first switch circuits 10 are configured to control, in response to signals of the corresponding scan lines G, the coupling between the data lines D and the data bus B; and the second switch circuits 20 are configured to control, in response to signals of the corresponding control lines C and the signals of the corresponding scan lines G, the pixel electrodes of the pixels P to be coupled to the corresponding data lines D.

During specific implementation, the display apparatus may be a flexible display apparatus or a rigid display apparatus, which is not limited here. Besides, the display apparatus may be a liquid crystal display (LCD) or an organic light-emitting diode (OLED), which is not limited here.

The display apparatus includes the plurality of pixels P arranged in an array, and the specific number of the plurality of pixel P may be M*N, wherein M and N are positive integers, and the specific number of M and N may be determined according to actual application, which is not limited here. The display apparatus includes the plurality of scan lines G coupled to the plurality of pixels P respectively and extending in the row direction, the plurality of data lines D coupled to the plurality of pixels P respectively and extending in the row direction and the plurality of control lines C coupled to the plurality of pixels P respectively and extending in the column direction, in actual application, the specific number of the scan lines G, the data lines D and the control lines C may be set according to arrangement of the pixels P in the display apparatus, for example, if the plurality of pixels P form an array of M rows and N columns, the number of the scan lines G and the number of the data lines D are each M, and the number of the control lines C is N.

The display apparatus further includes the data bus B coupled to the data lines D, the plurality of first switch circuits 10 corresponding to one data line D and the plurality of second switch circuits 20 corresponding to the pixels P, wherein the data bus B may carry an analog signal and transmit the analog signal to the pixels P through the data lines D. The first switch circuits 10 are configured to control, in response to the signals of the corresponding scan lines G, the coupling between the corresponding data lines D and the data bus B, in this way, it may be guaranteed that when one row of pixels P is opened, an output path of the data line D may also be opened to charge this row of pixels P, so that charging the specific row of pixels P is implemented while transmitting the analog signal from the data bus B to the corresponding row of pixels P is controlled. Besides, the second switch circuits 20 are configured to control, in response to the signals of the corresponding control lines C and the signals of the corresponding scan lines G, the pixel electrodes of the pixels P to be coupled to the corresponding data lines D, in this way, it may be guaranteed that when one row of pixels P is opened, merely one pixel P is charged every time, so that charging the specific pixel P on the specific row is implemented. Since, the display apparatus may transmit the analog signal to the pixels P through the data bus B, and analog-digital conversion is not needed in the whole process, the real-time property of image display is guaranteed.

In the embodiment of the present disclosure, still as shown in FIG. 2, the display apparatus further includes a row driving timing control circuit 30 coupled to each scan line G and a data bus controller 40 coupled to each control line C.

The row driving timing control circuit 30 is configured to output a scan signal to each scan line G and the corresponding first switch circuit 10 in sequence; and the data bus controller 40 is configured to output a control signal to each control line C in sequence.

The row driving timing control circuit 30 is configured to output the scan signal to each scan line G and the corresponding first switch circuit 10 in sequence, in this way, the row driving timing control circuit 30 may not only control opening a row path, but also control opening and closing an output path of the data bus B, and if the output path of the data bus B is opened, charging the corresponding row of pixels P may be implemented, and thus a purpose of row scan is achieved. Besides, the data bus controller 40 is configured to output the control signal to each control line C in sequence, in this way, the data bus controller 40 may control connection and disconnection of data of each pixel P on each row, so that it is guaranteed that when one row of pixels P is opened, merely one pixel P is charged every time, and thus charging the specific pixel P on the specific row is implemented.

In the embodiment of the present disclosure, still as shown in FIG. 2, the first switch circuits 10 each include a first transistor 11, the second switch circuits 20 each include a second transistor 21 and a third transistor 22, a gate electrode of the first transistor 11 and a gate electrode of the third transistor 22 are coupled to the corresponding scan lines G, a first electrode of the first transistor 11 is coupled to the data bus B, a second electrode of the first transistor 11 and a first electrode of the second transistor 21 are coupled to the corresponding data lines D, a gate electrode of the second transistor 21 is coupled to the corresponding control line C, a second electrode of the second transistor 21 is coupled to a first electrode of the third transistor 22, and a second electrode of the third transistor 22 is coupled to a pixel P electrode of the corresponding pixel P.

It needs to be noted that each of the transistors mentioned above may be a thin film transistor (TFT) or a metal oxide semiconductor (MOS), which is not limited here. According to a flow direction of the signals, the first electrode of the above transistor may be used as a source electrode thereof, correspondingly, the second electrode of the above transistor may be used as a drain electrode thereof; or the first electrode is used as the drain electrode, and correspondingly, the second electrode may be used as the source electrode, which is not limited here.

In the embodiment of the present disclosure, still as shown in FIG. 2, the data bus controller 40 includes a plurality of shift register units 41 in a cascade connection, a signal output end of each shift register unit 41 is coupled to the corresponding control line C, in every two adjacent shift register units 41, a signal input end of a lower-level shift register unit 41 is coupled to a signal output end of an upper-level shift register unit 41, another signal input end of each shift register unit 41 is coupled to a bus timing controller 50, the bus timing controller 50 is configured to output a clock pulse signal and load the clock pulse signal to each shift register unit 41 to be connected to the data bus controller 40 and a corresponding column of pixels P on the corresponding row of pixels P so as to charge the corresponding pixel P.

The data bus controller 40 includes the plurality of shift register units 41 in the cascade connection, the number of the shift register units 41 may be set according to actual application needs, and if the plurality of pixels P are M rows and N columns, the number of the shift register units 41 may be N, and correspondingly, the number of the control lines C may also be N. The bus timing controller 50 may output a clock pulse signal of a high level and loads the clock pulse signal to each shift register unit 41 to be connected to the data bus controller 40 and the corresponding column of pixels P on the corresponding row of pixels P so as to charge the corresponding pixel P. Since a data signal of the data bus B of each column may be opened in sequence through the clock pulse signal, in this way, it may be guaranteed that the second transistor 21 coupled to merely one control line C is opened every time, and Q0, Q1, Q2 . . . in FIG. 2 represent control signals outputted through the output ends of the shift register units 41 respectively.

In the embodiment of the present disclosure, still as shown in FIG. 2, the display apparatus further includes a first amplifier 60 coupled to the data bus B, the first amplifier 60 is configured to receive an analog image signal from the data bus B, amplify the analog image signal and output an amplified analog signal to each data line D.

The first amplifier 60 may receive the analog image signal from the data bus B, amplify the analog image signal and output the amplified analog signal to each data line D, in this way, before the display apparatus performs displaying, the analog image signal transmitted from the data bus B is amplified through the first amplifier 60, it is guaranteed that the pixels P are fully charged subsequently, and thus a display effect of the display apparatus is guaranteed.

It need to be noted that some noise may inevitably exist during signal transmission, which affects a charging effect and further affects the display effect, during specific implementation, an amplifier mat be put in each pixel P of the display apparatus, which is not shown in FIG. 2, in this way, before charging and displaying, amplifying processing is performed first, thus introduction of noise is effectively avoided, and the display effect is guaranteed.

Figure 3:
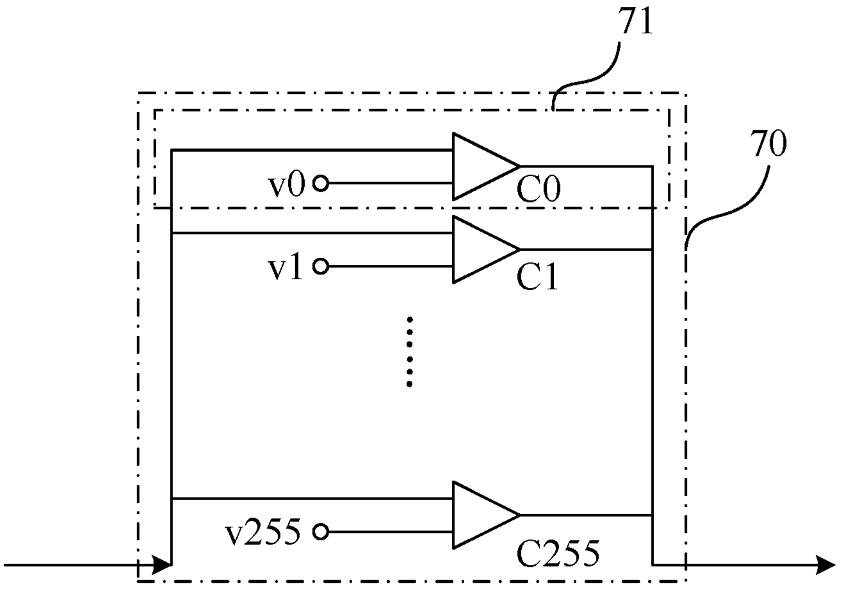
FIG. 3 is a schematic structural diagram of an image signal processing apparatus provided by an embodiment of the present disclosure.

Based on the same disclosed concept, as shown in FIG. 3, an embodiment of the present disclosure further provides an image signal processing apparatus, including:

a gray-scale separation unit 70, wherein the gray-scale separation unit 70 includes a plurality of voltage comparators 71, input ends of the voltage comparators 71 are coupled, output ends of the voltage comparators 71 are coupled, and the gray-scale separation unit 70 is configured to output an inputted analog image signal from a target voltage comparator 71 matching a gray-scale voltage of the analog image signal in the plurality of voltage comparators 71, wherein the voltage comparators 71 correspond to different gray-scale voltages.

During specific implementation, the number of the plurality of voltage comparators 71 may be set according to actual application needs, for example, 256, which is not limited here. The input ends of the voltage comparators 71 in the plurality of voltage comparators 71 are coupled, the output ends of the voltage comparators 71 are coupled, the gray-scale separation unit 70 may output the inputted analog image signal from the target voltage comparator 71 matching the gray-scale voltage of the analog image signal in the plurality of voltage comparators 71, as the voltage comparators 71 correspond to the different gray-scale voltages, a plurality of analog image signals inputted successively may successively flow into one voltage comparator 71 matching the gray-scale voltages of the analog image signals in the plurality of voltage comparators 71, in this way, the gray-scale voltages of the inputted analog image signals may be distinguished, and thus effectively processing the analog image signals is implemented and signal processing efficiency is guaranteed.

In the embodiment of the present disclosure, still as shown in FIG. 3, the gray-scale voltages corresponding to the voltage comparators 71 are in a decreasing tendency in an input direction of the analog image signals. If the plurality of voltage comparators 71 include 256 voltage comparators 71 of C0, C1, . . . . C255, the gray-scale voltages corresponding to the voltage comparators 71 respectively are G0, G1, . . . . G255, the magnitudes of the values of the gray-scale voltages corresponding to the voltage comparators 71 are in a decreasing tendency from G255 to G0 in the input direction of the analog image signals, besides, v0, v1, . . . v255 in FIG. 3 are preset voltage values, and magnitudes of the voltage values are in a decreasing tendency from v255 to v0. Gray-scale values of the voltage comparators 71 are different, so the analog image signals may be outputted merely from the voltage comparator 71 matching the gray-scale voltage of the analog image signal, thus the gray-scale voltages of the analog image signals may be stripped through the gray-scale separation unit 70, and the processed signals may be directly used for being displayed subsequently.

In the embodiment of the present disclosure, each voltage comparator 71 includes a window comparator 72, the window comparator 72 includes a first comparator 721, a second comparator 722 and a power supply end which is configured to provide a working power for the first comparator 721 and the second comparator 722, an input end of the window comparator 72 is coupled to a non-inverting input end of the first comparator 721 and an inverting input end of the second comparator 722, an output end of the first comparator 721 and an output end of the second comparator 722 are coupled to an output end of the window comparator 72, an inverting input end of the first comparator 721 is coupled, through a first resistor R0, to a first threshold voltage end which is configured to provide a first threshold voltage Ua, a non-inverting input end of the second comparator 722 is coupled, through a second resistor R1, to a second threshold voltage end which is configured to provide a second threshold voltage Ub, and an analog image signal of which a gray-scale voltage is located between the first threshold voltage Ua and the second threshold voltage Ub is outputted through the output end of the window comparator 72.

A first threshold voltage Ua and a second threshold voltage Ub corresponding to any two voltage comparators 71 in the plurality of voltage comparators 71 are different, and a voltage defined by the first threshold voltage Ua and the second threshold voltage Ub corresponding to each window comparator 72 is a gray-scale voltage of the corresponding voltage comparator 71.

Figure 4:
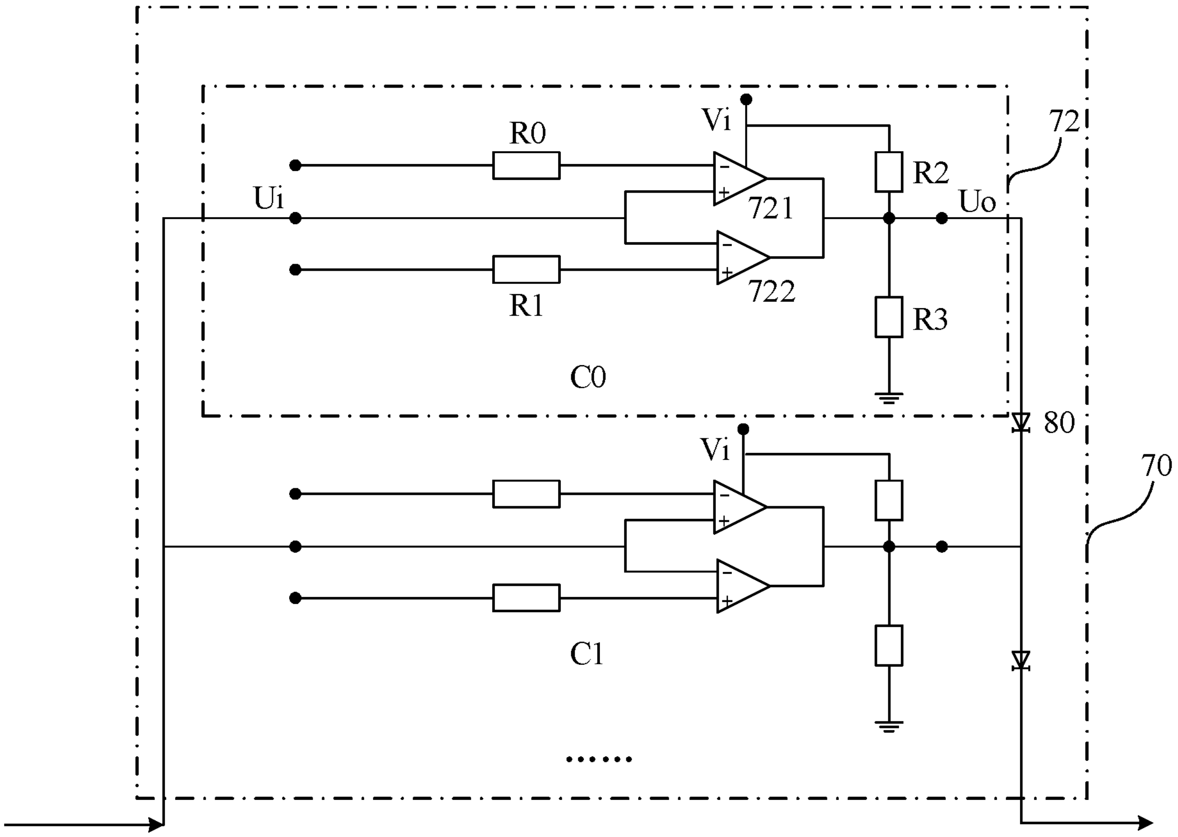
FIG. 4 is a schematic signal diagram of a voltage comparator in an image signal processing apparatus provided by an embodiment of the present disclosure.

FIG. 4 shows a schematic structural diagram of a window comparator 72 of a voltage comparator 71, the power supply end Vi is configured to provide the working power for the first comparator 721 and the second comparator 722 in the window comparator 72, and the analog image signal of which the gray-scale voltage is located between the first threshold voltage Ua and the second threshold voltage Ub may be outputted through the output end of the window comparator 72. For example, Ui is an inputted signal, when $Ub<Ui<Ua$, the signal Ui may be outputted through the output end of the window comparator 72, and a voltage of a signal Uo outputted through the output end is equal to Ui. It needs to be noted that a magnitude of the first threshold voltage Ua and a magnitude of the second threshold voltage Ub in the same window comparator 72 are different, the first threshold voltages Ua in the different window comparators are different, the second threshold voltages Ub in the different window comparators are also different, correspondingly, the voltages defined by the first threshold voltages Ua and the second threshold voltages Ub of the window comparators 72 are different, namely, the window comparators 72 correspond to the different gray-scale voltages respectively. In this way, it may be guaranteed that any analog image signal may be outputted from one window comparator 72, so that stripping of the different analog image signals is implemented, and processing efficiency of the analog image signals is improved.

In the embodiment of the present disclosure, still as shown in FIG. 4, each voltage comparator 71 further includes a voltage division circuit coupled to the window comparator 72, the voltage division circuit includes a third resistor R2 coupled to the power supply end Vi and the output end of the window comparator 72 respectively, and a fourth resistor R3 coupled to the output end of the window comparator 72 and the ground respectively, wherein a voltage, outputted through the output end of the corresponding window comparator 72, of the analog image signal inputted through the input end of the window comparator 72 is a gray-scale voltage of the analog image signal.

During specific implementation, in the voltage division circuit, a voltage Uo is a voltage of R3 after voltage division of R2 and R3, namely, UR3=Vi/(R2+R3)*R3=Uo=Ui, in this way, it is guaranteed that the outputted voltage Uo and the inputted voltage Ui do not have errors, and thus accuracy of data transmission is guaranteed. In actual application, the first threshold voltage Ua and the second threshold voltage Ub of each voltage comparator 71 are different values, the first threshold voltage and the second threshold voltage of each voltage comparator 71 may be set according to needs so that the analog image signal reaching the corresponding gray-scale voltage passes through the corresponding voltage comparator 71, for example, as for the voltage comparator 71 with a gray scale being 180, Ua is 180.5 mV and Ub is 179.5 mV, so an inputted signal of the gray scale being 180 and the voltage being 180 mV meets a condition and passes through the voltage comparator 71, but passing is not allowed if a voltage is greater than or less than Ua and Ub.

In the embodiment of the present disclosure, as shown in FIG. 4, a switching diode 80 is further arranged between output ends of every two adjacent voltage comparators 71, and in the input direction of the analog image signal, a cathode of the switching diode 80 is coupled to the output end of the former voltage comparator 71, and an anode of the switching diode 80 is coupled to the output end of the latter voltage comparator 71.

The switching diode 80 is further arranged between the output ends of every two adjacent voltage comparators 71, with respect to a flow direction of an electric current, the switching diode 80 is substantially a backward diode, an output of the voltage comparator 71 with a high gray-scale voltage may be prevented from affecting an output of a low gray-scale voltage through the switching diode 80, and thus accuracy of signal transmission is guaranteed.

Figure 5:
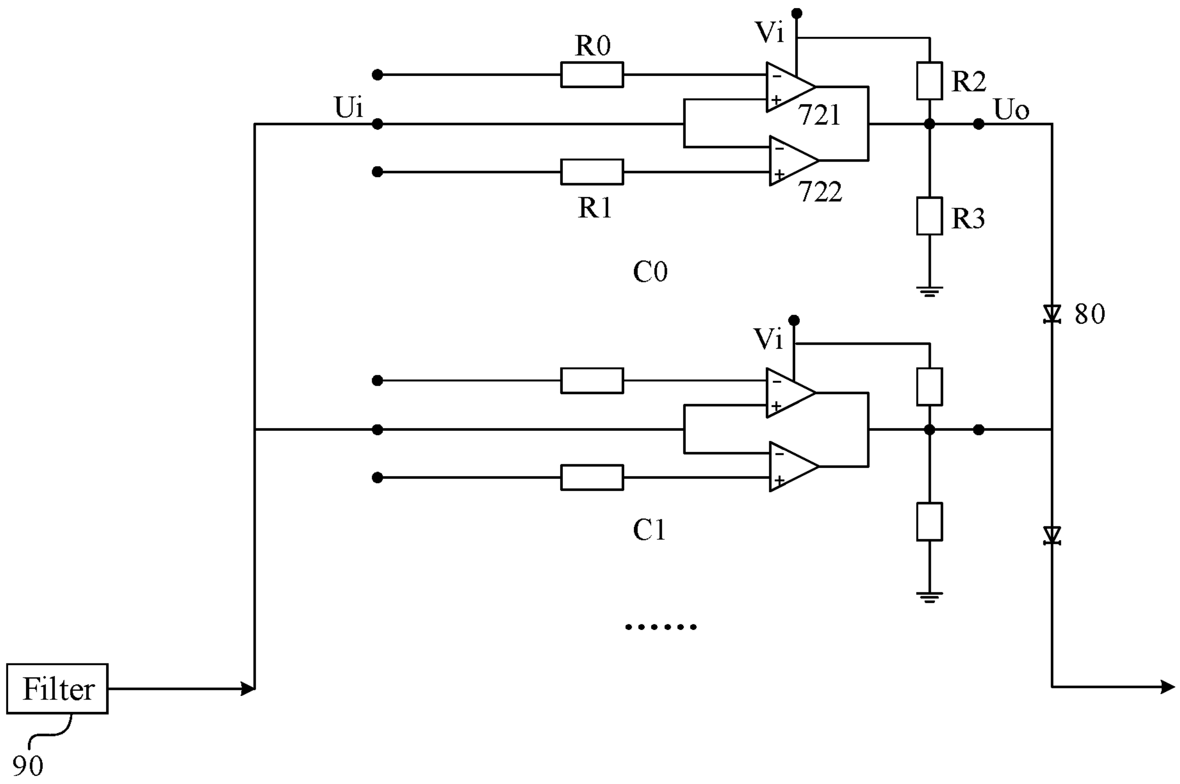
FIG. 5 is a schematic structural diagram of an image signal processing apparatus provided by an embodiment of the present disclosure.

In the embodiment of the present disclosure, as shown in FIG. 5, the image signal processing apparatus further includes a filter 90 coupled to the input end of each voltage comparator 71, and the filter 90 is configured to filter out noise in the analog image signal and input the analog signal of which the noise is filtered out to the gray-scale separation unit 70.

During specific implementation, before the analog image signal to be processed is inputted to the gray-scale separation unit 70, the noise in the analog image signal may be filtered out through the filter 90 coupled to the input end of each voltage comparator 71, then the analog signal of which the noise is filtered out is inputted into the gray-scale separation unit 70, and thus quality of signal transmission is guaranteed.

Figure 6:
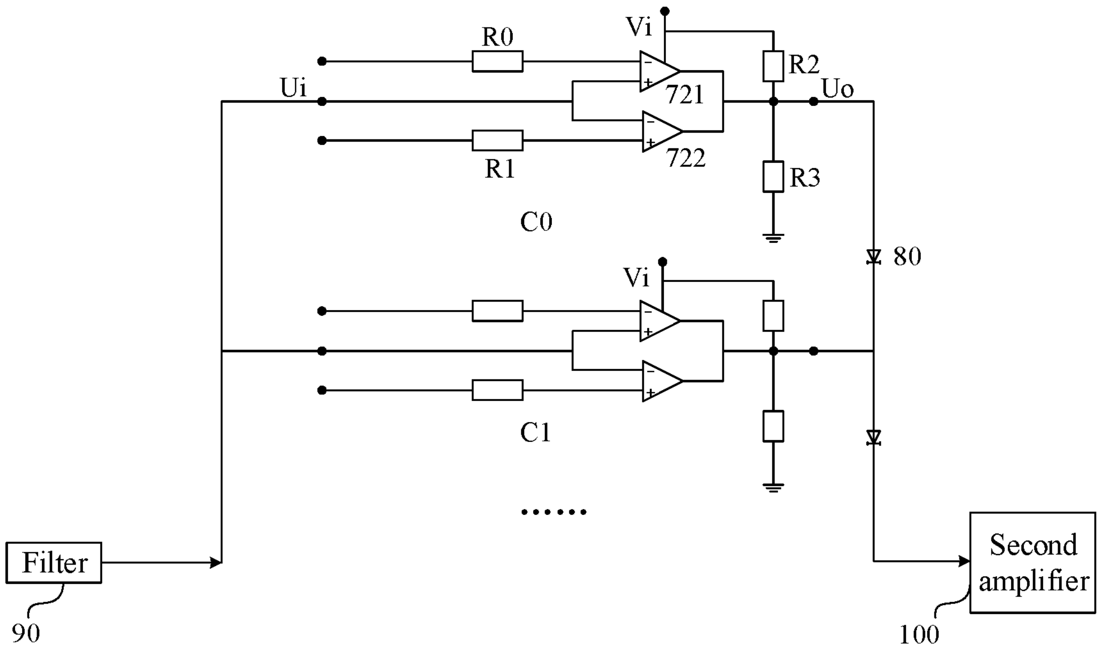
FIG. 6 is a schematic structural diagram of an image signal processing apparatus provided by an embodiment of the present disclosure.

In the embodiment of the present disclosure, as shown in FIG. 6, the image signal processing apparatus further includes a second amplifier 100 coupled to the output end of each voltage comparator 71 respectively, and the second amplifier 100 is configured to amplify the analog signal of which the noise is filtered out.

During specific implementation, the analog signal with the noise being filtered out, which is outputted through the gray-scale separation unit 70, may also be amplified through the second amplifier 100 coupled to the output end of each voltage comparator 71, and thus reliability of subsequent signal transmission is guaranteed.

Figure 7:
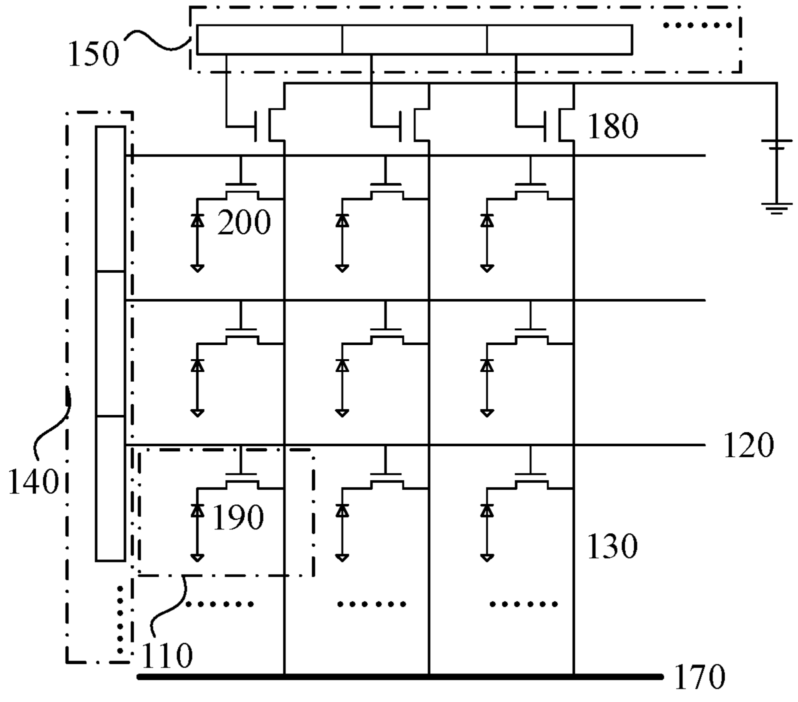
FIG. 7 is a schematic structural diagram of an image signal collection apparatus provided by an embodiment of the present disclosure.

Based on the same disclosed concept, as shown in FIG. 7, an embodiment of the present disclosure further provides an image signal collection apparatus, including:

a plurality of image-sensitive units 110 arranged in an array, a plurality of first signal lines 120 coupled to the plurality of image-sensitive units 110 respectively and extending in a row direction, a plurality of second signal lines 130 coupled to the plurality of image-sensitive units respectively and extending in a column direction, a row selection controller 140 coupled to each first signal line 120, a column selection controller 150 coupled to a first end of each second signal line 130, a timing control circuit coupled to the row selection controller 140 and the column selection controller 150 respectively, and an output bus 170 coupled to a second end of each second signal line 130.

The plurality of image-sensitive units 110 are configured to collect image information from the outside and convert the image information to the analog image signal; the row selection controller 140 is configured to output a scan signal to the plurality of first signal lines 120 in sequence; the column selection controller 150 is configured to control switching on a plurality of column control switches 180 in sequence so as to output a reference voltage to the corresponding first signal lines 120 and extract an analog signal generated by exposure on the corresponding image-sensitive units 110; and the output bus 170 is configured to output the analog signal after exposure.

During specific implementation, the number of the plurality of image-sensitive units 110 may be set according to actual application needs, for example, the number of the plurality of image-sensitive units 110 may be set according to a collection resolution of the image signal collection apparatus 300, which is not limited here. Correspondingly, the number of the first signal lines 120 and the number of the second signal lines 130 coupled to the plurality of image-sensitive units 110 may be set according to the actual application needs, which is not limited here. The plurality of image-sensitive units 110 may collect the image information from the outside and convert the image information to the analog image signal, the row selection controller 140 coupled to each first signal line 120 may output the scan signal to the plurality of first signal lines 120 in sequence, in this way, the corresponding rows of image-sensitive units 110 may be exposed row by row through the row selection controller 140. The column selection controller 150 coupled to the first end of each second signal line 130 may control switching on the plurality of column control switches 180 in sequence so as to output the reference voltage to the corresponding first signal lines 120 to extract the analog signal generated by exposure on the corresponding image-sensitive units 110, and thus successive exposure of each column of image-sensitive units 110 on the same row of image-sensitive units 110 is implemented. Besides, the output bus 170 coupled to the second end of each second signal line 130 may output the analog signal after exposure, so that collection and output of the image signal are implemented. In a whole collection process of the image signal, only the analog signal is under transmission, so that the real-time property of image collection is improved.

In the embodiment of the present disclosure, still as shown in FIG. 7, each image-sensitive unit 110 includes a photosensitive diode 190 and a row scan control switch 200. Control over exposure of the corresponding image-sensitive units 110 is implemented through control over on and off of the row scan control switch 200 and the column control switches 180 by means of the row selection controller 140 and the column selection controller 150, and a collection property of the image signal collection apparatus is guaranteed.

It needs to be noted that the column selection controller 150 may include a plurality of shift register units in a cascade connection, and an output end of each shift register unit is coupled to the corresponding second signal line 130; and the row selection controller 140 may include a plurality of shift register units in a cascade connection, and an output end of each shift register unit is coupled to the corresponding first signal line 120. In this way, control over exposure of the corresponding image-sensitive units 110 may be implemented through corresponding shift controllers. In addition, a gate electrode of each row scan control switch 200 is coupled to the corresponding first signal line 120, a first electrode of the row scan control switch is coupled to a cathode of the photosensitive diode 190, and a second electrode of the row scan control switch is coupled to the corresponding second signal line 130. A gate electrode of each column control switch 180 is coupled to the corresponding shift register unit.

During specific implementation, the image signal collection apparatus may be a complementary metal oxide semiconductor (CMOS) sensor, a charge coupled devices (CCD) sensor or another apparatus with an image collection function, which is not limited here.

Figure 8:
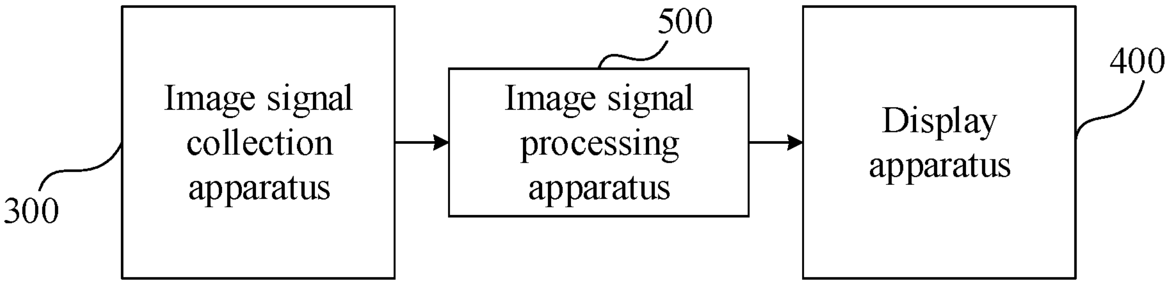
FIG. 8 is a schematic structural diagram of a display system provided by an embodiment of the present disclosure.

Based on the same disclosed concept, as shown in FIG. 8, an embodiment of the present disclosure further provides a display system, including:

an image signal collection apparatus 300, a display apparatus 400 and an image signal processing apparatus 500 which is coupled to the image signal collection apparatus 300 and the display apparatus 400 respectively.

The image signal collection apparatus 300 is configured to convert collected image information to an analog image signal and transmit the analog image signal to the image signal processing apparatus 500.

The image signal processing apparatus 500 is configured to determine a gray-scale voltage of the analog image signal and transmit the analog image signal to the display apparatus 400.

The display apparatus 400 is configured to perform displaying according to the analog image signal.

During specific implementation, the image signal collection apparatus 300 may be arranged on a non-display surface opposite to a display surface of the display apparatus 400, or arranged in another position different from a position of the display apparatus 400 in the display system, which may be set specifically according to actual application and is not limited here. The image signal collection apparatus 300 is configured to convert the collected image information to the analog image signal and transmit the analog image signal to the image signal processing apparatus 500, then the image signal processing apparatus 500 may determine the gray-scale voltage of the analog image signal and transmit the analog image signal to the display apparatus 400, and then the analog image signal is displayed through the display apparatus 400. In the display system, the image signal collection apparatus 300 converts the collected image information to the analog image signal, then the image signal processing apparatus 500 may directly determine the gray-scale voltage of the analog image signal, afterwards, the corresponding analog image signal is directly displayed through the display apparatus 400, merely the analog signal is collected and transmitted in the whole process, so that a transmission delay of the display system from image capturing to image display is avoided, and the real-time property of the display system from image capturing to image display is improved.

It needs to be noted that the display system may be a mixed reality system, a principle of the display system for solving problems is similar to those of the above display apparatus 400, image signal collection apparatus 300 and image signal processing apparatus 500, so implementation of the display system may refer to implementation of the above parts, and repetitions are omitted.

In the embodiment of the present disclosure, the image signal processing apparatus 500 includes:

a gray-scale separation unit 70, wherein the gray-scale separation unit 70 includes a plurality of voltage comparators 71, input ends of the voltage comparators 71 are coupled, output ends of the voltage comparators 71 are coupled, and the gray-scale separation unit 70 is configured to output an inputted analog image signal from a target voltage comparator 71 matching a gray-scale voltage of the analog image signal in the plurality of voltage comparators 71, wherein the voltage comparators 71 correspond to different gray-scale voltages.

It needs to be noted that if the image signal collection apparatus 300 is an RGB array, a pixel P in the display apparatus 400 is described according to RGB 24, namely, a pixel P may be described with three bytes, a red pixel r, a green pixel g and a blue pixel b each have eight bits, and the gray-scale separation unit 70 includes 256 voltage comparators 71, which correspond to gray-scale voltages of 0-255 respectively.

In the embodiment of the present disclosure, the display apparatus 400 includes:

a plurality of pixels P arranged in an array; a plurality of scan lines G coupled to the plurality of pixels P respectively and extending in a row direction; a plurality of data lines D coupled to the plurality of pixels respectively and extending in the row direction; a plurality of control lines C coupled to the plurality of pixels respectively and extending in a column direction; a data bus B coupled to the data lines D; a plurality of first switch circuits 10 corresponding to one data line D; and a plurality of second switch circuits 20 corresponding to the pixels P, wherein the pixels P each include a pixel electrode.

The first switch circuits 10 are configured to control, in response to signals of the corresponding scan lines G, the coupling between the data lines D and the data bus B; and the second switch circuits 20 are configured to control, in response to signals of the corresponding control lines C and the signals of the corresponding scan lines G, pixel electrodes of the pixels P to be coupled to the corresponding data lines D.

In the embodiment of the present disclosure, the image signal collection apparatus 300 includes:

a plurality of image-sensitive units 110 arranged in an array, a plurality of first signal lines 120 coupled to the plurality of image-sensitive units 110 respectively and extending in a row direction, a plurality of second signal lines 130 coupled to the plurality of image-sensitive units respectively and extending in a column direction, a row selection controller 140 coupled to each first signal line 120, a column selection controller 150 coupled to a first end of each second signal line 130, a timing control circuit 160 coupled to the row selection controller 140 and the column selection controller 150 respectively, and an output bus 170 coupled to a second end of each second signal line 130.

The plurality of image-sensitive units 110 are configured to collect image information from the outside and convert the image information to the analog image signal; the row selection controller 140 is configured to output a scan signal to the plurality of first signal lines 120 in sequence; the column selection controller 150 is configured to control switching on a plurality of column control switches 180 in sequence so as to output a reference voltage to the corresponding first signal lines 120 and extract an analog signal generated by exposure on the corresponding image-sensitive units 110; and the output bus 170 is configured to output the analog signal after exposure.

It needs to be noted that in the display system, an arrangement mode of the plurality of image-sensitive units 110 included in the image signal collection apparatus 300 is the same as that of the plurality of pixels P included in the display apparatus 400, the number of the image-sensitive units is the same as the number of the pixels, for example, if the plurality of image-sensitive units 110 are arranged in M rows and N columns, the plurality of pixels p are also arranged in M rows and N columns. After the image signal collection apparatus 300 exposes an $s^{th}$ row of image-sensitive units 110 in sequence from left to right, correspondingly, the gray-scale separation unit 70 transmits the exposed analog signal to the corresponding $s^{th}$ row of pixels P in the display apparatus 400 according to an exposure sequence, and the display apparatus 400 lights up each pixel P in the $s^{th}$ row of pixels P in sequence from left to right. In other words, the image signal collection apparatus 300 adopts row-by-row exposure and row-by-row successive output, and correspondingly, the display apparatus 400 performs lighting-up row by row and successive display row by row.

Figure 9:
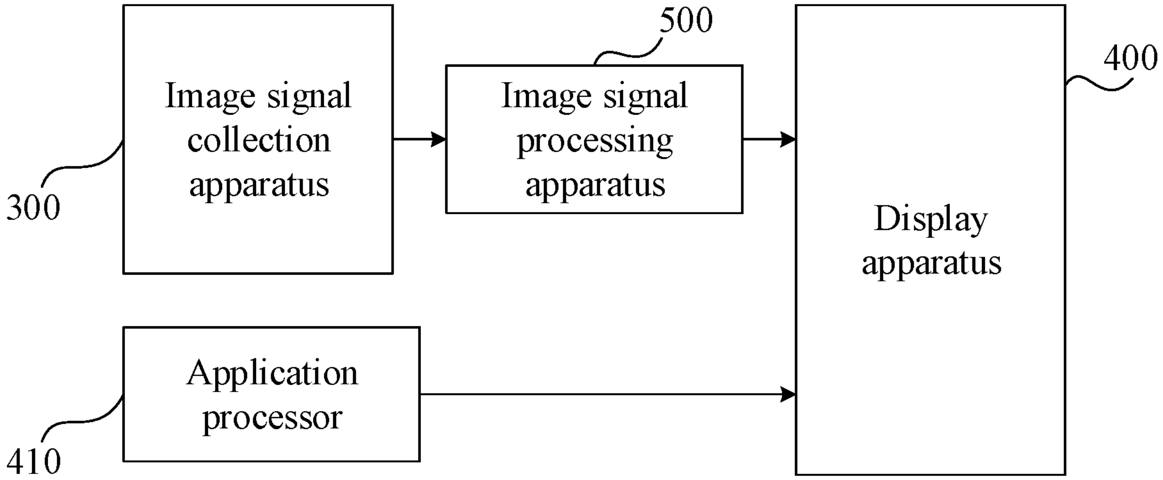
FIG. 9 is a schematic structural diagram of a display apparatus in a display system provided by an embodiment of the present disclosure.

In the embodiment of the present disclosure, as shown in FIG. 9, the display apparatus 400 further includes an application processor 410, and in a case that the display apparatus 400 is in a human-computer interaction mode, the application processor 410 is configured to render and generate virtual image data to obtain rendered image data, and send the rendered image data to the plurality of pixels P in the display apparatus 400 so as to make the plurality of pixels P display the rendered image data.

In a case that the display system is in an outside scene capturing mode, the plurality of pixels P display the analog image signal.

During specific implementation, the display system may have various display modes, for example, a virtual display mode under the human-computer interaction mode, for another example, a real-scene display mode under the outside scene capturing mode. In order to guarantee that the display system is compatible with the human-computer interaction mode and the outside scene capturing mode, the display system is further provided with the application processor 410 in addition to the image signal processing apparatus 500. Two interfaces or a mode-switching single interface may be further arranged on corresponding hardware of a display drive chip on the display apparatus 400, an image processed by the image signal processing apparatus 500 and an image processed by the application processor 410 are displayed in a time sharing mode through the display apparatus 400, and thus the display system is compatible with the human-computer interaction mode and the outside scene capturing mode. In addition, in order to implement switching between the human-computer interaction mode and the outside scene capturing mode, one-key switching between different modes may be implemented through a physical key arranged in the application processor 410.

If the display system is in the human-computer interaction mode, the image signal processing apparatus 500 is off, the virtual image data may be rendered and generated through the application processor 410, then the obtained rendered image data is sent to the plurality of pixels P in the display apparatus 400, and the rendered image data is displayed through the plurality of pixels P. At the moment, a user may experience a virtual world through the display system and interact with the display system through the application processor 410.

If the display system is in the outside scene capturing mode, the image signal processing apparatus 500 is on, the image obtained through the image signal collection apparatus 300 may be processed through the image signal processing apparatus 500, and real-time capturing of the image in the outside scene capturing mode is guaranteed. At the moment, the user may obtain an outside real world in real time through the display system. In actual application, the user may autoselect a display mode of the display system according to actual needs, and thus use experience of the user is guaranteed.

Besides, the image signal processing apparatus 500 may further be integrated in the display drive chip of the display apparatus 400 in addition to being independently arranged on the display apparatus 400, a data bus controller 40 and a row driving timing controller in the display apparatus 400 may also be integrated in the display drive chip, thus an integrated design of the display system is achieved, and light and thin design of the display system is guaranteed. Certainly, specific design for the image signal collection apparatus 300 and the image signal processing apparatus 500 may be set according to actual application needs, which is not limited here.

It needs to be noted that the accompanying drawings provided by the embodiments of the present disclosure illustrate merely design of part of circuits in part of pixels P in the image signal collection apparatus 300 and the display apparatus 400, so during specific implementation, an actual image of the image signal collection apparatus 300 and the display apparatus 400 is not subject to these accompanying drawings and may be flexibly designed specifically according to actual applications, which is not described in detail here. Besides, the display system may further include other devices in addition to the above mentioned structures, which may specifically refer to related description in the prior art and is not described in detail here.

Although the preferred embodiments of the present disclosure have been described, those skilled in the art may make extra changes and modifications to these embodiments once they know the basic creative concept. Therefore, the appended claims are intended to be construed as including the preferred embodiments and all changes and modifications falling within the scope of the present disclosure.

Apparently, those skilled in the art may make various modifications and variations to the present disclosure without departing from the spirit and scope of the present disclosure. In this case, if these modifications and variations of the present disclosure fall within the scope of the claims of the present disclosure and their equivalents, the present disclosure is also intended to include these modifications and variations.

What is claimed is:

1. A display apparatus, comprising:

a plurality of pixels arranged in an array;

a plurality of scan lines coupled to the plurality of pixels respectively and extending in a row direction;

a plurality of data lines coupled to the plurality of pixels respectively and extending in the row direction;

a plurality of control lines coupled to the plurality of pixels respectively and extending in a column direction;

a data bus coupled to the data lines;

a plurality of first switch circuits corresponding to one data line; and a plurality of second switch circuits corresponding to the pixels, wherein the pixels each comprise a pixel electrode;

wherein the first switch circuits are configured to control, in response to signals of the corresponding scan lines, the coupling between the corresponding data lines and the data bus, and the second switch circuits are configured to control, in response to signals of the corresponding control lines and the signals of the corresponding scan lines, pixel electrodes of the pixels to be coupled to the corresponding data lines.

2. The apparatus according to claim 1, further comprising:

a row driving timing control circuit coupled to each scan line, and a data bus controller coupled to each control line, wherein the row driving timing control circuit is configured to output a scan signal to each scan line and the corresponding first switch circuit in sequence; and the data bus controller is configured to output a control signal to each control line in sequence.

3. The apparatus according to claim 2, wherein the first switch circuits each comprise a first transistor, the second switch circuits each comprise a second transistor and a third transistor, a gate electrode of the first transistor and a gate electrode of the third transistor are coupled to the corresponding scan lines, a first electrode of the first transistor is coupled to the data bus, a second electrode of the first transistor and a first electrode of the second transistor are coupled to the corresponding data lines, a gate electrode of the second transistor is coupled to the corresponding control line, a second electrode of the second transistor is coupled to a first electrode of the third transistor, and a second electrode of the third transistor is coupled to the pixel electrode of the corresponding pixel.

4. The apparatus according to claim 3, wherein the data bus controller comprises a plurality of shift register units in a cascade connection, a signal output end of each shift register unit is coupled to the corresponding control line, in every two adjacent shift register units, a signal input end of a lower-level shift register unit is coupled to a signal output end of an upper-level shift register unit, another signal input end of each shift register unit is coupled to a bus timing controller, the bus timing controller is configured to output a clock pulse signal and load the clock pulse signal to each shift register unit to be connected to the data bus controller and a corresponding column of pixels on the corresponding row of pixels so as to charge the corresponding pixel.

5. The apparatus according to claim 1, wherein the display apparatus further comprises a first amplifier coupled to the data bus, the first amplifier is configured to receive an analog image signal from the data bus, amplify the analog image signal and output an amplified analog signal to each data line.

6. An image signal processing apparatus, comprising:

a gray-scale separation unit, wherein the gray-scale separation unit comprises a plurality of voltage comparators, input ends of the voltage comparators are coupled, output ends of the voltage comparators are coupled, and the gray-scale separation unit is configured to output an inputted analog image signal from a target voltage comparator matching a gray-scale voltage of the analog image signal in the plurality of voltage comparators, wherein the voltage comparators correspond to different gray-scale voltages.

7. The apparatus according to claim 6, wherein the gray-scale voltages corresponding to the voltage comparators are in a decreasing tendency in an input direction of the analog image signal.

8. The apparatus according to claim 7, wherein each voltage comparator comprises a window comparator, the window comparator comprises a first comparator, a second comparator and a power supply end which is configured to provide a working power for the first comparator and the second comparator, an input end of the window comparator is coupled to a non-inverting input end of the first comparator and an inverting input end of the second comparator, an output end of the first comparator and an output end of the second comparator are coupled to an output end of the window comparator, an inverting input end of the first comparator is coupled, through a first resistor, to a first threshold voltage end which is configured to provide a first threshold voltage, a non-inverting input end of the second comparator is coupled, through a second resistor, to a second threshold voltage end which is configured to provide a second threshold voltage, and an analog image signal of which a gray-scale voltage is located between the first threshold voltage and the second threshold voltage is outputted through the output end of the window comparator; wherein a first threshold voltage and a second threshold voltage corresponding to any two voltage comparators in the plurality of voltage comparators are different, and a voltage defined by the first threshold voltage and the second threshold voltage corresponding to each window comparator is a gray-scale voltage of the corresponding voltage comparator.

9. The apparatus according to claim 8, wherein each voltage comparator further comprises a voltage division circuit coupled to the window comparator, the voltage division circuit comprises a third resistor coupled to the power supply end and the output end of the window comparator respectively, and a fourth resistor coupled to the output end of the window comparator and the ground respectively, wherein a voltage, outputted through the output end of the corresponding window comparator, of the analog image signal inputted through the input end of the window comparator is the gray-scale voltage of the analog image signal.

10. The apparatus according to claim 9, wherein a switching diode is further arranged between output ends of every two adjacent voltage comparators, and in an input direction of the analog image signal, a cathode of the switching diode is coupled to the output end of the former voltage comparator, and an anode of the switching diode is coupled to the output end of the latter voltage comparator.

11. The apparatus according to claim 10, further comprising a filter coupled to the input end of each voltage comparator, and the filter is configured to filter out noise in a to-be-inputted analog image signal and input the analog image signal of which the noise is filtered out to the gray-scale separation unit.

12. The apparatus according to claim 11, further comprising a second amplifier coupled to the output end of each voltage comparator, and the second amplifier is configured to amplify the analog image signal outputted through the gray-scale separation unit to obtain an amplified analog signal.

13. A display system, comprising:

an image signal collection apparatus, a display apparatus and an image signal processing apparatus which is coupled to the image signal collection apparatus and the display apparatus respectively; wherein the image signal collection apparatus is configured to convert collected image information to an analog image signal and transmit the analog image signal to the image signal processing apparatus;

the image signal processing apparatus is configured to determine a gray-scale voltage of the analog image signal and transmit the analog image signal to the display apparatus; and the display apparatus is configured to perform displaying according to the analog image signal;

wherein the display apparatus comprises:

a plurality of pixels arranged in an array, a plurality of scan lines coupled to the plurality of pixels respectively and extending in a row direction, a plurality of data lines coupled to the plurality of pixels respectively and extending in the row direction, a plurality of control lines coupled to the plurality of pixels respectively and extending in a column direction, a data bus coupled to the data lines, a plurality of first switch circuits corresponding to one data line, and a plurality of second switch circuits corresponding to the pixels, wherein the pixels each comprise a pixel electrode, wherein the first switch circuits are configured to control, in response to signals of the corresponding scan lines, the coupling between the data lines and the data bus; and the second switch circuits are configured to control, in response to signals of the corresponding control lines and the signals of the corresponding scan lines, pixel electrodes of the pixels to be coupled to the corresponding data lines.

14. The system according to claim 13, wherein the image signal processing apparatus comprises:

a gray-scale separation unit, wherein the gray-scale separation unit comprises a plurality of voltage comparators, input ends of the voltage comparators are coupled, output ends of the voltage comparators are coupled, the gray-scale separation unit is configured to output an inputted analog image signal from a target voltage comparator matching a gray-scale voltage of the analog image signal in the plurality of voltage comparators, and the voltage comparators correspond to different gray-scale voltages.

15. The system according to claim 13, wherein the image signal collection apparatus comprises:

a plurality of image-sensitive units arranged in an array, a plurality of first signal lines coupled to the plurality of image-sensitive units respectively and extending in a row direction, a plurality of second signal lines coupled to the plurality of image-sensitive units respectively and extending in a column direction, a row selection controller coupled to each first signal line, a column selection controller coupled to a first end of each second signal line, a timing control circuit coupled to the row selection controller and the column selection controller respectively, and an output bus coupled to a second end of each second signal line; wherein the plurality of image-sensitive units are configured to collect image information from the outside and convert the image information to the analog image signal;

the row selection controller is configured to output a scan signal to the plurality of first signal lines in sequence;

the column selection controller is configured to control switching on a plurality of column control switches in sequence so as to output a reference voltage to the corresponding first signal lines and extract an analog signal generated by exposure on the corresponding image-sensitive units; and the output bus is configured to output the analog signal after exposure.

16. The system according to claim 15, wherein each image-sensitive unit comprises a photosensitive diode and a row scan control switch.

17. The system according to claim 13, wherein the display apparatus further comprises an application processor, and in a case that the display system is in a human-computer interaction mode, the application processor is configured to render and generate virtual image data to obtain rendered image data, send the rendered image data to the plurality of pixels in the display apparatus so as to make the plurality of pixels display the rendered image data; and in a case that the display system is in an outside scene capturing mode, the plurality of pixels display the analog image signal.

* * * * *